Aug. 4, 1970  D. C. HUGHES  3,522,982
COLLAPSIBLE SCREEN ASSEMBLY FOR PORTABLE
MOTION PICTURE PROJECTOR
Original Filed Aug. 18, 1965  2 Sheets-Sheet 2

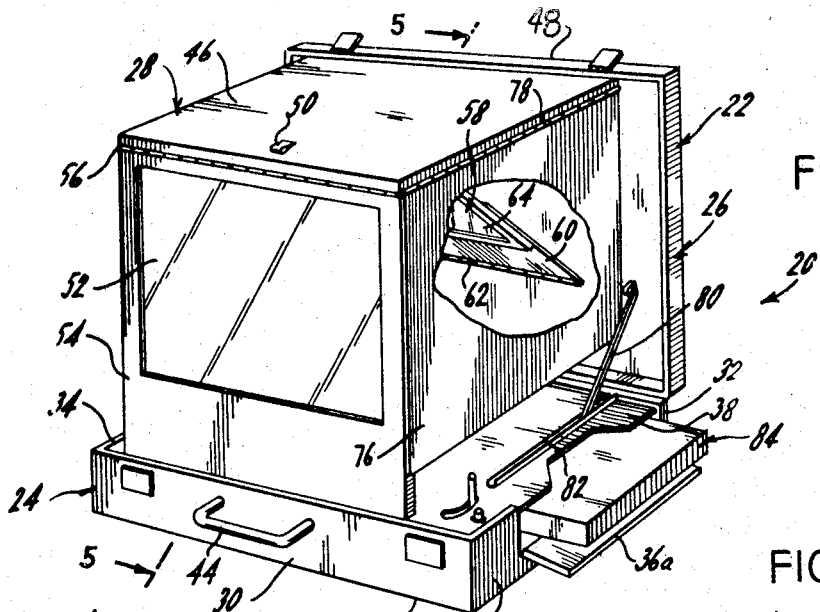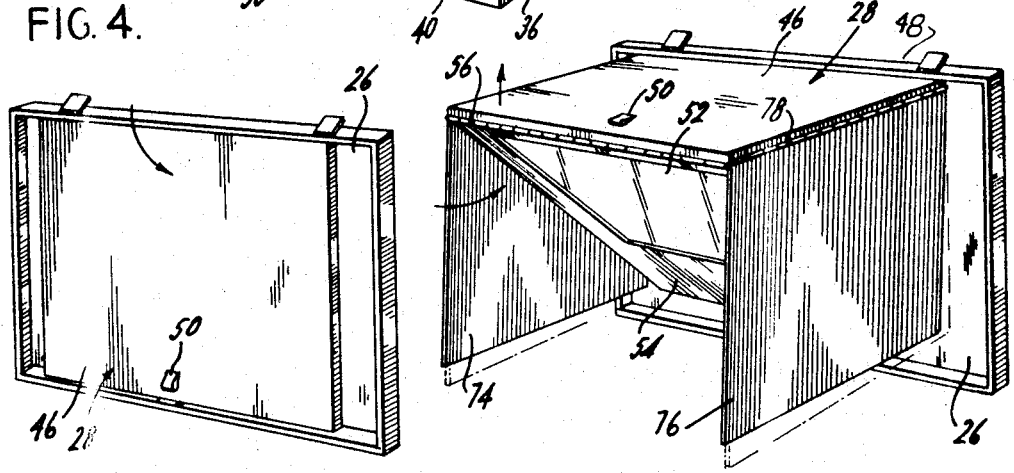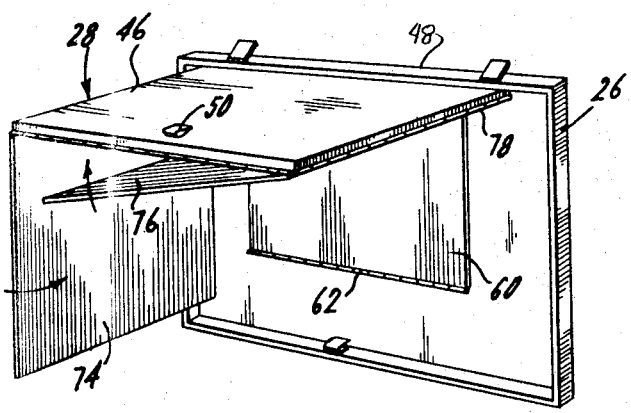

INVENTOR.
DAVID C. HUGHES
BY
Amster & Rothstein
ATTORNEYS

United States Patent Office 3,522,982
Patented Aug. 4, 1970

3,522,982
COLLAPSIBLE SCREEN ASSEMBLY FOR PORTABLE MOTION PICTURE PROJECTOR
David C. Hughes, White Plains, N.Y., assignor, by mesne assignments, to Bohn Benton Inc., New York, N.Y., a corporation of New York
Original application Aug. 18, 1965, Ser. No. 480,600, now Patent No. 3,375,055, dated Mar. 26, 1968. Divided and this application Nov. 15, 1967, Ser. No. 683,165
Int. Cl. G03b 21/56
U.S. Cl. 350—124                    8 Claims

ABSTRACT OF THE DISCLOSURE

A collapsible screen assembly for a motion picture projector of the portable type wherein the rear screen assembly and reflecting mirror are collapsible for flat storage within the cover of the case for carriage or front projection and may be instantly erected for rear projection.

---

This is a division of application Ser. No. 480,600 filed Aug. 18, 1965, now Patent No. 3,375,055 and entitled "Cartridge Type Sound Motion Picture Projector." The present invention relates generally to a collapsible rear screen assembly for motion picture projectors. Advantageously, the present invention provides a screen assembly which is compatible with the provision of a highly compact, self-sufficient portable motion picture projector system intended for either rear projection or front projection.

With the increasing applications of audio-visual presentations in teaching, training and selling devices, motion picture projectors are employed in the home, in schools and in industry. Often the projector must be operated by a student, teacher, salesman or other person ordinarily inexperienced in the operation of motion picture projectors. These persons frequently find it inconvenient to set up a reflecting screen and darken the room to secure adequate image intensity.

There exists a need for a motion picture projector which is self-sufficient in terms of incorporating its own screen assembly, is suitable for rapid change from front to rear projection, is compact and portable. Specifically, it is an object of the present invention to provide a screen assembly for a motion picture projector, preferably contained within a portable carrying case that may easily be erected for rear projection, or easily folded out of the way for front projection.

In accordance with an illustrative embodiment demonstrating objects and features of the present invention, the projector includes a collapsible screen assembly which is adapted to be housed within a carrying case which has the external appearance and size of an attache case. The projector mechanisms are mounted within the base of a carrying case having a hinged cover, with image-projecting optics within the base. The collapsible screen assembly is housed within the cover of the carrying case when the cover is in its closed position and may be extended into an erected position when the cover is open. The collapsible screen assembly includes a translucent screen whcih is brought into position for rear projection with the necessary mirror being interposed automatically between the image-projecting optics contained within the base and the translucent screen to project the image on the screen. The screen is automatically and releasably locked in place. Further, the screen is constructed in such a manner that it may be completely collapsed into a compact assembly for storage within the cover. The screen is readily erectable with the minimum of manipulative steps that are simple for an unskilled person to accomplish.

The above description, as well as further objects and features of the present invention will be more fully appreciated by reference to the following description of a presently preferred, but nonetheless illustrative embodiment in accordance with the present invention, when taken in conjunction with the accompanying drawings, wherein:

FIG. 1 is a perspective view of a portable projector demonstrating features of the present invention, shown with the collapsible screen assembly in the erected position, with part of one light shield broken away to expose the internal construction;

FIG. 2 is a perspective view similar to FIG. 1, but with the base removed and showing the translucent screen partially folded back incident to collapsing the screen assembly;

FIG. 3 is a perspective view similar to FIG. 2, with the translucent screen, the mirror and its support, in the stored position and with one of the light shields partially folded to its stored position;

FIG. 4 is a perspective view showing the collapsible screen completely housed in the cover so that the cover may be closed over the base of the carrying case.

Figure 5:
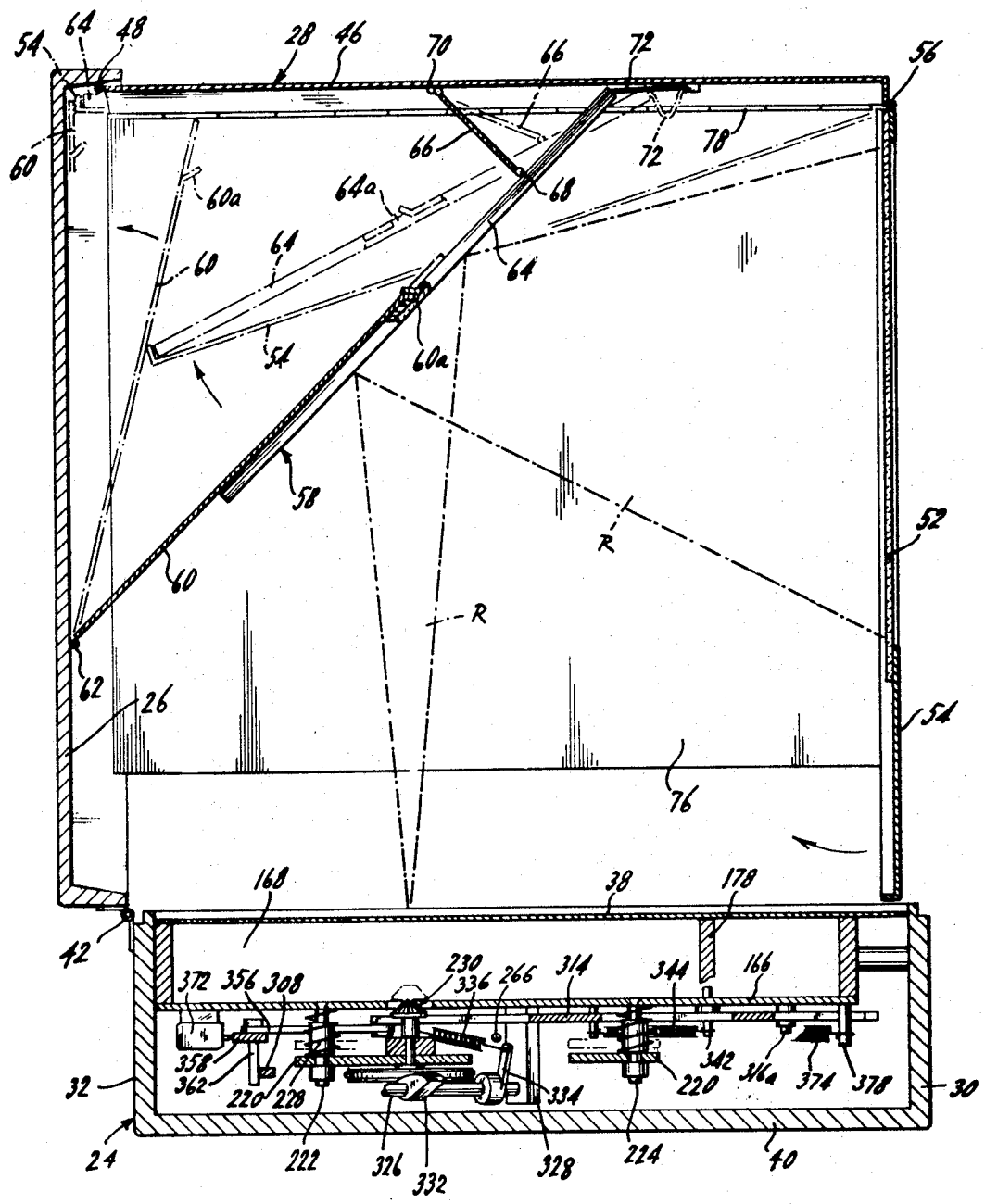
FIG. 5 is a vertical sectional view of the screen with the case opened and the screen erected, taken substantially along the lines 5—5 in FIG. 1 and looking in the direction of the arrows.

Referring now specifically to the drawings, there is shown a motion picture projector embodying features of the present invention and generally designated by the reference numeral 20 which includes a carrying case 22 having a base 24 and a cover 26. The base 24 houses the projector mechanisms which are described in parent application Ser. No. 490,600, now U.S. Pat. No. 3,375,-055 of March 26, 1968. The cover 26 houses a collapsible screen assembly, generally designated by the reference numeral 28.

Referring first to FIGS. 1 and 5, the base 24 of the carrying case 22 is seen to include front and rear walls 30, 32, opposite side walls 34, 36 and top and bottom walls 38, 40 containing the projector. The cover 26 is hingedly connected to the base along the upper edge of the rear wall 32 by hinges 42 for movement about a cover pivot between a closed position overlying the top wall 38 of the base 24 and an open position extending substantially at right angles to the top wall 38, as indicated in FIG. 1. As is detailed in said patent, projector mechanisms are mounted within the base 24 and include image-projecting optics projecting an upwardly directed light beam extending through and substantially at right angles to the top wall 38, as generally indicated in FIG. 5 by the diverging light rays R.

The collapsible screen assembly 28 is normally housed within the cover 26 when the latter is in a closed position overlying the base 36, with the screen assembly 28 collapsed and stored as shown in FIG. 4. The screen assembly 28 is extensible into the erected position illustrated in FIG. 1 with the cover 26 in the opened position, by the progressive erection steps illustrated in FIGS. 4 to 1 inclusive; and conversely, the screen assembly 28 may be collapsed into the stored or housed position illustrated in FIG. 4 by going through the steps shown progresseively in FIGS. 1 to 4 inclusive. The collapsible screen assembly includes a carrier member 46 hingedly connected to the cover 26 by hinges 48 (see FIG. 5) for movement about a carrier pivot spaced from and parallel to the cover pivot afforded by the hinges 42. The carrier member 46 is adapted to be swung between the erected position substantially parallel to the top wall 38 of the base and at right angles to the cover 26 (see FIGS. 1 and 5) and a collapsed position lying within the outline of the cover 26 and parallel thereto (see FIG. 4). For convenience, a lift tab 50 is secured to the carrier member 46 contiguous to the front edge thereof. A translucent screen 52 mounted within a frame 54 is hingedly connected to the carrier member 46 by hinge 56 for movement about a screen pivot spaced from and parallel to the carrier pivot afforded by the hinge 48. The screen and frame 52, 54 are movable from a depending position extending vertically and freely, as illustrated in FIGS. 1 and 5, to a stored or collapsed position underlying the carrier member 46.

A reflecting subassembly, generally designated by the reference numeral 58, is mounted on the cover 26 and the carrier member 46 and serves as a collapsible crossbrace extending at an angle of approximately 45° to the erected cover 26 and carrier member 46, as seen in FIGS. 1 and 5. The reflecting subassembly includes a supporting arm 60 which is connected by hinge 62 to the cover 26 for movement about an arm pivot intermediate and parallel to the cover and carrier pivots 42, 48 and a framed reflecting mirror 64 which is hingedly connected to the carrier member 46 intermediate and parallel to the carrier and screen pivots 48, 56. The framed mirror 64 is hingedly connected to the carrier member 46 by a suspending link 66 having a pivotal connection 68 at the back of the mirror 64 contiguous to the upper end thereof and a pivotal connection 70 to the carrier member 46. Additionally, a flexible band or strap 72 is attached to the upper end of the mirror 64 and the underside of the carrier member 46 to impart stability to the brace and to limit the pivotal movement of suspending link 66.

As seen best in the full and broken line shown in FIG. 5, interengaging locking means are provided on the supporting arm 60 and the reflecting mirror 64 for releasably securing the components of the reflecting subassembly 58 at an acute angle to the incident light beam when the cover 26 is in the opened position and the carrier member 46 is in the erected position. In the erected position, the mirror 64 will center the reflected beam through the erected translucent screen 52, as shown by the full lines in FIG. 5. The interengaging locking means include a locking finger 60a on the supporting arm 60 which is bent at an angle thereto and is received within an appropriate slot or cut-out 64a in the back side of the framed mirror 64 (see the broken line showing of FIG. 5). When the finger 60a is engaged within the slot 64a, the supporting arm 60 and mirror 64 become a rigid angled brace maintaining the cover 26 and the carrier member 46 in the requisite relation and to each other and the mirror 64 at its proper reflecting angle. When disengaged, by lifting carrier member 46 and raising the screen frame 54 toward its stored position, the supporting arm 60 is automatically swung about the arm pivot 62 to its stored position lying against the inside of the cover 26 (as shown by the progressive dotted lines in FIG. 5), and the mirror 64 is at the same time swung to its stored position lying against the underside of the carrier member 46, as likewise shown by the progressive dotted line showings in FIG. 5.

As seen best in the several figures, light shields 74, 76 are hingedly connected to the opposite sides of the carrier member 46 by hinges 78 so that the shields may be pivoted about respective shield pivots extending at right angles to the carrier and screen pivots 48, 56. The light shields 74, 76 are normally housed within the cover 26 overlying each other and underlying the translucent screen 52, 54, as may be seen in the progressive FIGS. 2 and 3. In the erected position of the screen assembly 28, the light shields depend from the carrier member 46 to cooperate with the cover 26 and the carrier 46 and the top wall 38 to define a light shielded enclosure for the projected image.

Provision is made for releasably securing the cover 26 in the open position extending substantially at right angles to the base 24 of the carrying case 22. In this illustrative embodiment, two hinged braces 80 (see FIG. 1) are pivotally attached on each edge of the inside of the cover 26 and are releasably engaged along respective tracks 82 on the top wall 38 to hold the cover 26 in the open position.

In order to appreciate the manner in which the screen assembly 28 may be collapsed, a typical sequence of closing will be described, with progressive reference being made to FIGS. 1 to 4 inclusive and the several dotted line showings in FIG. 5. The operator grasps the tab 50 to lift the carrier member 46 slightly upwardly, as indicated by the directional arrow in FIG. 2, which disengages the locking elements 60a, 64a. Thereupon, the screen 52, 54 may be swung rearwardly about the screen pivot 56, as indicated in FIG. 2 by the directional arrow. As the screen 52, 54 swings rearwardly it engages the lower end of the mirror 64 and the supporting arm 60, swinging the latter to its stored position lying against the cover 26 and the former to its stored position against the carrier member 46, as indicated by the progressive dotted line showings in FIG. 5. Finally, the light shields 74, 76 may be swung inwardly to overlie each other and underlie the screen 52, 54 whereupon the folded subassembly may be swung about the carrier pivot 48 into the stored position illustrated in FIG. 4.

An advantage of the screen 28 is that it permits the projector 20 to be used for front projection. This is accomplished by folding the collapsible screen assembly 28 to housed position within the cover 26 and supporting the projector, with the aid of an adjustable leg or prop, on the rear wall 32 (FIG. 5) so that the lens assembly will project the image toward a remote front screen. The projected image will be correctly oriented both right to left and top to bottom since the optical path in the first instance experiences two reversals after leaving the projection lens assembly, a first by the mirror 64 and a second by the translucent screen 52. Thus, the projector can serve for front projection, with the storage of the collapsible screen in cover 26, without the addition of any optical attachments.

What I claim is:

1. A portable projector comprising a carrying case including a base having a top wall and a cover hingedly connected to said base for movement about a cover pivot between a closed position overlying said top wall and an open position, a projector mechanism in said base and including image-projecting optics providing an upwardly directed light beam extending through said top wall, and a collapsible screen assembly normally housed within said cover when the latter is in said closed position and extensible to an erected position when said cover is in said open position, said screen assembly including a carrier member hingedly connected to said cover for movement about a carrier pivot spaced from and parallel to said cover pivot to an erected position, a translucent screen hingedly connected to said carrier member for movement about a screen pivot spaced from and parallel to said carrier pivot to an erected position depending from said carrier member, and a reflecting subassembly mounted on said cover and carrier member and including a supporting arm hingedly connected to said cover for movement about an arm pivot intermediate and parallel to said cover and carrier pivots, a reflecting mirror hingedly connected to said carrier member intermediate and parallel to said carrier and screen pivots and interengaging locking means on said supporting arm and reflecting mirror for releasably securing said reflecting subassembly at an acute angle to the incident light beam when said cover is in said open position and said carrier member is in said erected position such that said mirror will direct the reflected beam through the erected translucent screen.

2. A portable projector according to claim 1 wherein said carrier member, screen and reflecting subassembly are proportioned and arranged such that the collapsed screen assembly includes said supporting arm lying against said cover, said reflecting mirror lying adjacent said carrier member and said screen overlying said reflecting mirror and confronting said carrier member, said cover being proportioned such that said collapsible screen assembly may be housed therein and said cover is able to move into said closed position.

3. A portable projector according to claim 1 further including respective light shields hingedly connected to said carrier member at respective shield pivots at right angles to and intermediate said carrier and screen pivots, said light shields depending from said carrier member when screen assembly is in said erected position to cooperate with said cover, said carrier member and said top wall to define a light enclosure for the incident and reflected beam.

4. A portable projector comprising a carrying case including a base having a top wall and a cover hingedly connected to said base for movement about a cover pivot between a closed position overlying said top wall and an open position extending at an angle to said top wall, a projector mechanism in said base and including image-projecting optics providing an upwardly directed light beam extending through and substantially at right angles to said top wall, and a collapsible screen assembly normally housed within said cover when the latter is in said closed position and extensible to an erected position when said cover is in said open position, said screen assembly including a carrier member hingedly connected to said cover for movement about a carrier pivot spaced from and parallel to said cover pivot to an erected position extending substantially parallel to said top wall, a translucent screen hingedly connected to said carrier member for movement about a screen pivot spaced from and parallel to said carrier pivot to an erected position depending from said carrier member and extending substantially at right angles to said top wall, and a reflecting subassembly mounted on said cover and carrier member and including a supporting arm hingedly connected to said cover for movement about an arm pivot intermediate and parallel to said cover and carrier pivots, a reflecting mirror hingedly connected to said carrier member intermediate and parallel to said carrier and screen pivots and interengaging locking means on said supporting arm and reflecting mirror for releasably securing said reflecting subassembly at an acute angle to the incident light beam when said cover is in said open position and said carrier member is in said erected position such that said mirror will direct the reflected beam through the erected translucent screen.

5. A portable projector according to claim 4 further including respective light shields hingedly connected to said carrier member at respective shield pivots at right angles to and intermediate said carrier and screen pivots, said light shields normally being housed within said cover overlying each other and underlying said translucent screen and depending from said carrier member when said screen assembly is in said erected position to cooperate with said cover, said carrier member and said top wall to define a light enclosure for the incident and reflected beam.

6. A portable projector according to claim 5 wherein said carrier member, screen and reflecting subassembly are proportioned and arranged such that the collapsed screen assembly includes said supporting arm lying against said cover, said reflecting mirror lying adjacent said carrier member, said screen overlying said reflecting mirror and confronting said carrier member and said light shields overlying each other and confronting said screen, said cover being proportioned such that said collapsible screen assembly may be housed therein and said cover is able to move into said closed position.

7. A portable projector according to claim 4 including manually operable means for releasably securing said cover in said open position.

8. A portable projector suitable for both rear projection and forward projection to a remote screen comprising a carrying case including a base having a bottom wall, closed front, side and rear walls and a top opening, and a cover hingedly connected to said base contiguous to the rear wall thereof for movement about a covered pivot between a closed position overlying said top opening and an open position substantially at right angles to said base, means for releasably securing said cover in said open position, a collapsible screen assembly normally housed within said cover including a screen mounting structure for mounting said screen in a rear projection position parallel to said cover and spaced away from said cover when said cover is in said open position and said base is in a horizontal position and for mounting said screen in a folded position parallel to said cover and adjacent to said cover when said cover is in said open position and said base is in a vertical position, a light source in said base, and image projecting means arranged in said base for projecting a light beam in a single optical path from said light source through said top opening and outwardly away from said top opening at substantially right angles to said top opening during both rear and forward projection, said cover in said open position being in a clearance position with respect to said optical path, a mirror extensible from said cover when said screen is in said rear projection position for directing the projection beam onto the rear of said screen, said path during forward projection being uninterrupted from said top opening to said distant screen, said path during rear projection being interrupted by said mirror and deflected toward said collapsible screen.

References Cited

UNITED STATES PATENTS 2,525,552 10/1950 Kingston.
2,685,817 8/1954 Freeman _____ 350—123

JOHN M. HORAN, Primary Examiner

M. H. HAYES, Assistant Examiner

U.S. Cl. X.R.

350—123; 352—34, 104